United States Patent [19]

Ichiryu et al.

[11] 4,428,559

[45] Jan. 31, 1984

[54] DIRECT DRIVE TYPE SERVO VALVE

[75] Inventors: Ken Ichiryu, Mito; Haruo Watanabe, Hitachi; Ichiro Nakamura, Katsuta; Yoshimichi Akasaka, Hitachi, all of Japan

[73] Assignee: Hitachi, Ltd., Tokyo, Japan

[21] Appl. No.: 267,914

[22] Filed: May 28, 1981

[30] Foreign Application Priority Data

Jun. 4, 1980 [JP] Japan .................................. 55-74345

[51] Int. Cl.³ ...................... F15B 13/044; F16K 31/04
[52] U.S. Cl. .................................. 251/129; 137/625.65; 251/337
[58] Field of Search .................. 137/625.65; 251/129, 251/337; 267/181

[56] References Cited

U.S. PATENT DOCUMENTS 3,749,128 7/1973 Sallberg et al. ............. 137/625.65 X

FOREIGN PATENT DOCUMENTS 2143798 3/1973 Fed. Rep. of Germany ...... 267/181
45-34351 11/1970 Japan .............................. 137/625.65
50-94375 7/1975 Japan .
55-10162 1/1980 Japan .............................. 137/625.65
55-10198 1/1980 Japan .............................. 137/625.65

*Primary Examiner*—Gerald A. Michalsky
*Attorney, Agent, or Firm*—Thomas E. Beall, Jr.

[57] ABSTRACT

A direct drive type servo motor in which a spool is driven directly by a force motor, the force of the force motor being balanced by the reactional force generated by a resilient member to stabilize the position of the spool to control the flow of working fluid. The resilient member is constituted by a metallic cylindrical member having holes formed in the outer peripheral surface thereof. The holes are arranged such that, when the force is applied to the cylindrical member in the axial direction, the cylindrical member produces an axial reactional force. In consequence, the generation of force component which would act to press the spool against the sleeve is avoided to reduce the friction between the spool and the sleeve to permit a smooth movement of the spool, while allowing the resilient member to have a high spring constant to improve the response characteristic of the servo valve.

12 Claims, 5 Drawing Figures

DIRECT DRIVE TYPE SERVO VALVE

BACKGROUND OF THE INVENTION

The present invention relates to a direct-drive type servo valve in which a spool is directly driven by a force motor and the driving power of the force motor is balanced by the reactional force of a resilient member to stabilize the position of the spool.

Hitherto, coiled springs have been used as the resilient member for stabilizing the position of the spool in direct drive type servo motor. In the case of the coiled spring, however, it is extremely difficult to precisely coincide the center of the spool with the center of the coiled spring, because some error is inevitable in the assembling. Even if the coincidence of the center is obtained, the terminal end of the coil makes a close contact with the adjacent coil, so that the portion of the coiled spring making this close contact exhibits a higher spring constant than the portion where no contact is made. In consequence, the direction of the reactional force is inclined to the axis of the spool to generate a component of force which acts to press the spool against the wall of the sleeve. As a result, the friction between the spool and the sleeve is increased to hinder the smooth movement of the spool and to increase the hysteresis of the servo valve itself.

In order to obviate above-described problem, Japanese Patent Laid-open No. 94375 discloses a spool valve in which a diaphragm supported by the valve member is interposed between the force motor and the spool. However, it is extremely difficult to increase the spring constant while maintaining a high linearity of the characteristic between the force and the displacement. With this arrangement, therefore, it is not possible to obtain a high response characteristic of the spool valve.

SUMMARY OF THE INVENTION

Accordingly, an object of the invention is to provide a servo valve in which the generation of the force component which acts to press the spool against the sleeve is avoided to ensure a smooth movement of the spool and, hence, a superior response characteristic of the servo valve.

To this end, according to the invention, there is provided a servo valve of the type in which the spool is driven directly by a force motor and the driving power of the force motor is balanced by the reactional force of a resilient member to stabilize the position of the spool, characterized in that the resilient member includes a metallic cylindrical member provided in its peripheral surface with grooves or holes which are arranged such that, when the metallic cylindrical member is pressed in the axial direction, the metallic cylindrical member produces an axial reactional force.

According to this arrangement, the reactional force acts precisely in the axial direction of the spool so that no component which would press the spool against the sleeve is produced. In addition, it is possible to obtain a sufficiently large spring constant to ensure a superior response characteristic by suitably selecting the size and number of the holes.

DESCRIPTION OF THE PREFERRED EMBODIMENTS

Figure 1:
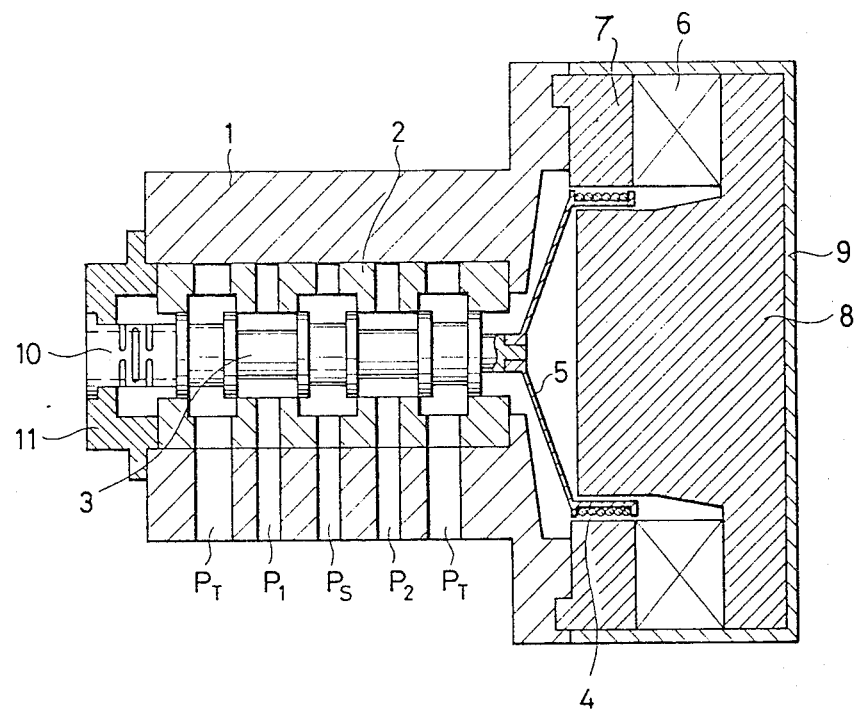
FIG. 1 is a sectional view of a direct drive type servo valve constructed in accordance with an embodiment of the invention.

Referring first to FIG. 1 showing in section a direct drive type servo valve constructed in accordance with an embodiment of the invention, a spool 3 is adapted to be moved in the axial direction in a sleeve 2 which is mounted in a valve body 1. A supply port $P_S$ for supplying the working fluid to the valve, drain port $P_T$ for returning the drain fluid from the valve, and load ports $P_1, P_2$ are formed in the valve body 1 and the sleeve 2. The passage of the fluid is changed in accordance with the movement of the spool 3.

To the right-side end of the spool 3, fixed is a coil bobbin 5 by an electron beam welding or shrinkage fit. A coil 4 is wound round the bobbin 5. A reference numeral 6 denotes a magnet for producing a magnetic field which acts on the coil 4. This magnet 6 is fixed to the valve body 1 by means of a member 7 having a through bore, a member 8 having a columnar projection and a cover 9. The coil bobbin around which the coil is wound is received by an annular gap between the members 7 and 8, in such a manner that air gaps are formed at both sides of the coil.

The magnet 6, coil 4 and the coil bobbin 5 in combination constitute a force motor. The arrangement is such that, as the electric current is supplied to the coil 4, the driving power proportional to the level of the electric current is produced to drive the spool through the medium of the coil bobbin in the axial direction.

At the left side of the spool 3, disposed is a resilient member 10 made of the same metallic material as the spool and formed integrally with the latter. The resilient member 10 is supported on the valve member 1 by means of a supporting member 11. In consequence, the spool is displaced until the level of the reactional force produced by the resilient member comes to equal to the level of the driving force produced by the force motor. When the balance of equilibrium of the force is obtained, the spool is stopped. Thus, the position at which the spool is stopped can be changed by changing the level of the electric current.

Figure 2:
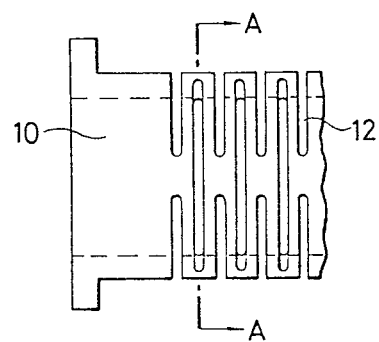
FIG. 2 is an enlarged front elevational view of a resilient member.
Figure 3:
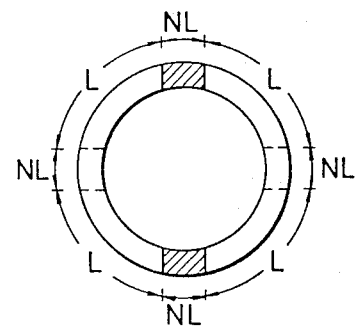
FIG. 3 is a view of the resilient member as viewed in the directions of arrow A—A of FIG. 2.

FIG. 2 is an enlarged view of a resilient member shown in FIG. 1, while FIG. 3 is a view in the direction of the arrow A—A of FIG. 2. This resilient member 10 has a cylindrical form and is provided with seven pairs of grooves or elongated holes 12 formed in the outer peripheral surface thereof. Each pair includes two elongated holes 12 which extend along the same circumferential line but are not continuous with each other. The seven pairs of holes 12 are arrayed in the axial direction of the resilient member in a circumferentially staggered manner such that the elongated holes of one pair are axially aligned with the discontinuities of the adjacent pairs of the elongated holes. Namely, the entire circumference of the resilient member is provided with the elongated holes 12. In consequence, the cylinder resilient member as a whole takes an axially flexural construction to form an expandable and shrinkable resilient structure. As will be seen from FIG. 3, the elongated holes of the axially adjacent pairs of holes include a circumferentially lapping region L and no lapping region NL. In this embodiment, the regions L or regions NL are arranged in symmetry with respect to the axis of the resilient member so that an axial reactional force is obtained as the force is applied in the axial direction to the resilient member. Thus, the resilient member 10 can produce the reactional force without generating any component of force which would press the sleeve against the wall of the spool. In addition, it is possible to obtain any desired spring constant, particularly a high spring constant of, for example, 50 Kg/mm, by suitably selecting the size and number of the holes. In consequence, the valve itself can have a high resonance frequency to remarkably improve the response characteristic of the valve.

Figure 4:
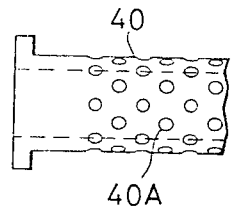
FIG. 4 is a front elevational view of another example of the resilient member.

In the described embodiment, the holes 12 are formed to extend in the circumferential direction of the resilient member. These circumferential holes are formed at a high precision easily by, for example, discharging processing. The circumferentially elongated form of the holes, however, is not exclusive. Namely, it is possible to form a multiplicity of small holes as shown in FIG. 4 or, although not shown, to form a single continuous spiral hole, in place of the circumferentially elongated holes in the first embodiment. In this embodiment, the resilient member can be formed easily because it has a cylindrical form. In addition, the spool and the resilient member can be formed coaxially without fail by forming these members as a unit. In addition, the members for connecting the resilient member, spool and the coil bobbin are eliminated to reduce the weight of the movable part of the spool valve to permit a superior response characteristic of the latter.

The spool and the resilient member are formed integrally from the same material which satisfies the requirementds for both members, e.g. durability, resiliency and so forth, while the coil bobbin which requires reduced weight rather than the strength is made from a light alloy such as of titanium, aluminum or magnesium. By so doing, it is possible to further reduce the mass of the movable part to further enhance the response characteristic of the valve.

Figure 5:
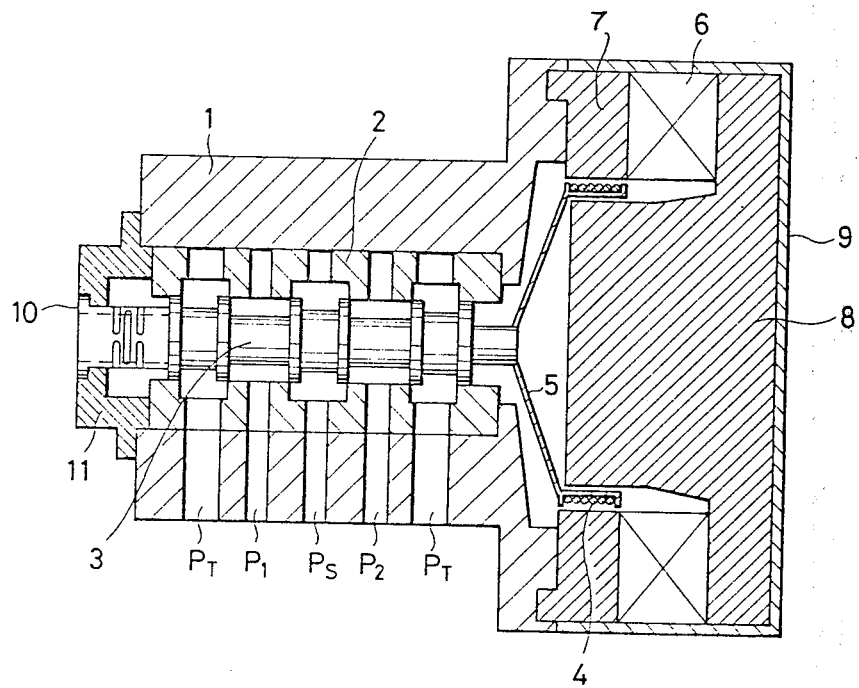
FIG. 5 is a sectional view of a servo valve constructed in accordance with another embodiment of the invention.

FIG. 5 is a sectional view of a servo valve in accordance with another embodiment of the invention. This embodiment differs from the first embodiment shown in FIG. 1 in that the resilient member, spool and the coil bobbin are formed in one body from the same metallic material in axial alignment. According to this arrangement, it is possible to maintain a small gap of the force motor because the resilient member, spool and the coil bobbin are held precisely coaxially with one another. The reduced air gap in turn affords an increased magnetic force of the force motor so that the response characteristic of the servo valve is further increased. In this embodiment, in order to reduce the mass of the movable parts of the servo valve, it is preferred to form the integral body of the resilient member, spool and the coil bobbin from a light alloy such as of titanium, aluminum and so forth and to effect a surface hardening treatment such as carburizing, nitriding or the like at least on the spool and the resilient member.

What is claimed is:

1. A direct drive type servo valve in which a spool in a sleeve is directly driven by the operation of a coil bobbin which constitutes a portion of the movable part of a force motor, while the force of the force motor is balanced by the reactional force generated by a resilient member to stabilize the position of said spool to control the flow of working fluid, characterized in that, said resilient member is constituted by a metallic cylindrical member having holes formed in the outer peripheral surface thereof, said holes being arranged to permit said metallic cylindrical member to generate an axial reactional force when pressed in the axial direction, that said resilient member is formed in one body with said spool from the same material so as to be correctly coaxial with each other, and that said coil bobbin is fixed to said spool coaxially with the latter.

2. A direct drive type servo valve as claimed in claim 1, wherein said holes are arranged in a plurality of sets spaced in the axial direction, each set including a plurality of circumferentially spaced elongated holes, such that the holes belonging to axially adjacent sets partially lapping in the circumferential direction, the lapping portions being arranged in symmetry with respect to the axis of said cylindrical member.

3. A direct drive type servo valve as claimed in claim 2, wherein said coil bobbin is made of a light metal.

4. A direct drive type servo valve as claimed in claim 2, wherein said resilient member has a cylindrical tubular form coaxial with said spool; said resilient member having one axial end integrally secured to said spool and an opposite axial end rigidly secured to said sleeve.

5. A direct drive type servo valve as claimed in claim 4, wherein said resilient member and spool are unitarily formed from one homogeneous material.

6. A direct drive type servo valve in which a spool in a sleeve is driven directly by the operation of a coil bobbin which constitutes a portion of the movable part of a force motor, while the force of the force motor is balanced by a reactional force generated in a resilient member to stabilize the position of said spool to control the flow of working fluid, characterized in that said resilient member is constituted by a metallic cylindrical member having holes formed in the outer peripheral surface thereof, said holes being arranged such that said metallic cylindrical member produces an axial reactional force when pressed in the axial direction, and that said resilient member, said spool and said coil bobbin are formed in one body from the same material so as to be coaxial with one another.

7. A direct drive type servo valve as claimed in claim 6, wherein said holes are arranged in plural in the axial direction, the axially adjacent holes lapping partially in the circumferential direction, the lapping portions being arranged in symmetry with respect to the axis of said cylindrical member.

8. A direct drive type servo valve as claimed in claim 7, wherein said cylindrical member, said spool and said coil bobbin are made of a light alloy, at least said cylindrical member and said spool being subjected to a surface hardening treatment.

9. A direct drive type servo valve as claimed in claim 7, wherein said resilient member has a cylindrical tubular form coaxial with said spool; said resilient member having one axial end integrally secured to said spool and an opposite axial end rigidly secured to said sleeve.

10. A direct drive type servo valve as claimed in claim 9, wherein said resilient member and spool are unitarily formed from one homogeneous material.

11. A direct drive type servo valve in which a spool is driven within a valve body directly by a force motor and the force of the force motor is balanced by a reactional force generated by a resilient member to stabilize the position of said spool to control the flow of working fluid, characterized in that said resilient member includes a metallic tubular member having a plurality of separate axially and peripherally spaced apart holes formed in the outer peripheral surface thereof, said holes being so arranged that, when a force is applied to said resilient member in the axial direction, said resilient member produces a reactional force in the axial direction, said holes being so arranged as to cover the entire circumference of said resilient member, said holes being formed in a plurality of sets axially spaced from adjacent ones, each of said sets including a plurality of circumferentially extending holes arranged in the same circumferential line, the holes belonging to adjacent sets of holes partially lapping in the circumferential direction, said resilient member having a cylindrical tube form coaxial with said spool, said holes being arranged in symmetry with respect to the axis of said tube and spool, and said resilient member having one axial end integrally secured to said spool and an opposite axial end rigidly secured to said valve body.

12. A direct drive type servo valve as claimed in claim 11, wherein said resilient member and spool are unitarily formed from one homogeneous material.

* * * * *